United States Patent
Tzeng

(10) Patent No.: US 7,671,781 B2
(45) Date of Patent: Mar. 2, 2010

(54) SYSTEM AND METHOD FOR PRODUCING CHARACTER ON INTERACTIVE EQUIPMENT

(75) Inventor: Ruey-Yuan Tzeng, Taipei (TW)

(73) Assignee: Lite-On Technology Corp., Taipei (TW)

(*) Notice: Subject to any disclaimer, the term of this patent is extended or adjusted under 35 U.S.C. 154(b) by 929 days.

(21) Appl. No.: 11/424,814

(22) Filed: Jun. 16, 2006

(65) Prior Publication Data

US 2006/0290536 A1    Dec. 28, 2006

(30) Foreign Application Priority Data

Jun. 27, 2005   (TW) .............................. 94121509 A

(51) Int. Cl.
*H04L 17/02* (2006.01)

(52) U.S. Cl. ............. 341/173; 340/825.69; 340/825.72; 348/734

(58) Field of Classification Search ............... 341/20, 341/22, 173, 176; 340/825.69, 825.72; 345/173; 348/734

See application file for complete search history.

(56) References Cited

U.S. PATENT DOCUMENTS 6,690,303 B1   2/2004   Shitara et al.
7,154,566 B2 *   12/2006   Gustafson et al. ........... 348/734

FOREIGN PATENT DOCUMENTS

TW      I 226011      1/2005

* cited by examiner

*Primary Examiner*—Albert K Wong

(57) ABSTRACT

A system and method for producing a character are provided. A remote control device having a plurality of numeral keys and capable of inputting a plurality of values is used to issue a command representing one of the plurality of values and composed of a combination of the plurality of numeral keys to an interactive equipment. In the interactive equipment, a reference table is provided to provide a relationship between the plurality of values and a plurality of characters each corresponding to one thereof. By referring to the reference table, the value corresponding to the command can be converted to a corresponding character among the plurality of characters. Finally, the character can be displayed and thus produced on the interactive equipment.

19 Claims, 3 Drawing Sheets

| value | character | value | character |
|---|---|---|---|
| 1 | A | 14 | N |
| 2 | B | 15 | O |
| 3 | C | 16 | P |
| 4 | D | 17 | Q |
| 5 | E | 18 | R |
| 6 | F | 19 | S |
| 7 | G | 20 | T |
| 8 | H | 21 | U |
| 9 | I | 22 | V |
| 10 | J | 23 | W |
| 11 | K | 24 | X |
| 12 | L | 25 | Y |
| 13 | M | 26 | Z |

Fig. 3

SYSTEM AND METHOD FOR PRODUCING CHARACTER ON INTERACTIVE EQUIPMENT

FIELD OF THE INVENTION

The present invention relates to a system and method for producing a character, and more particular to a system and method for producing a character on an interactive equipment without being provided with any keyboard.

BACKGROUND OF THE INVENTION

Nowadays, more and more bi-way interaction capable equipment is available, or the equipment is capable of being connected to the Internet resource. Such equipment is generally termed as "interactive equipment." For example, when a user desires to look up and acquire some information on the network, diverse characters and symbols in addition to alphabets and numerals need to be inputted to the interactive equipment, such as an English name "George W. Bush", a Chinese name "王大同", and an appropriate search engine website address. However, most of such interactive equipment is not provided with any keyboard for character inputting. Responsive to this, a software-based virtual keyboard in cooperation with an infrared remote control device is one of the most effective solutions.

In such a solution, the remote control device can be used to input a character to the equipment through its key combinations or selection keys. However, such inputting method has a disadvantage of being too slow since the key combination for a specific character has to be kept in an associated memory or looked up in a lookup table when the former scheme is adopted, and a multiple of clicks of the keys are required when the latter scheme is used. In this case, the user is prone to be less interested in the use of the interactive equipment.

In view of the above, there is a need to provide a technology for producing a character on the interactive equipment. After a long intensive series of experiments and research, the inventor finally sets forth a system and method for producing a character on the interactive equipment, which may effectively overcome the demerits existing in the prior art.

SUMMARY OF THE INVENTION

It is, therefore, an object of the present invention to provide a method for producing a specific character on an interactive equipment. The method according to the present invention comprises steps of providing in the interactive equipment a reference table of mapping each of a plurality of values to a corresponding one of a plurality of characters including the specific character, providing a remote control device having a plurality of numeral keys, sending to the interactive equipment a command representing one of the plurality of values corresponding to the specific character through at least one of the plurality of numeral keys from the remote control device, retrieving the specific character by referring to the reference table in response to the command, and displaying the specific character on the interactive equipment.

In an embodiment, the method further comprises a step of (a0), before the step (a), enabling the reference table to be shown on the interactive equipment.

In an embodiment, the reference table is a graph user interface (GUI) and is activated on the interactive equipment by a designated key of the remote control device.

In an embodiment, the designated key is another key in addition to the plurality of numeral keys.

In an embodiment, the designated key is formed with the plurality of numeral keys.

In an embodiment, each of the values is a number selected from a group consisting of single-digit, two-digit and three-digit ones.

In an embodiment, the specific character is one of an ASCII code and a UNICODE code.

It is another object of the present invention to provide an interactive equipment. The iterative equipment according to the present invention comprises a reference table configured having a mapping relationship therein for a plurality of values and a plurality of characters, a processing module for converting one of the plurality of values into a corresponding one of the plurality of characters by referring to the reference table in response to a command from a remote control device capable of inputting the plurality of values thereinto, and a display module for displaying the corresponding character.

In an embodiment, the interactive equipment further comprises a receiving module for receiving the command.

In an embodiment, the processing module comprises a determining unit for determining whether the command is a valid command.

In an embodiment, the processing module comprises a converting unit for retrieving and converting the one of the plurality of values and obtaining the corresponding character.

It is still another object of the present invention to provide a system for producing a character. The system according to the present invention comprises a remote control device and an interactive equipment, the remote control device comprising a plurality of numeral keys capable of inputting a plurality of values for outputting a command corresponding to one of the plurality of values corresponding to the character by a user, and the interactive equipment comprising a receiving module for receiving the command, a reference table providing a relationship between the plurality of values and a plurality of characters including the character, a processing module for converting the one of the plurality of values into the plurality of characters by referring to the reference table in response to the command; and a display module for displaying the character.

In an embodiment, the remote control device further comprises a key for outputting a designated command from the user.

In an embodiment, the designated command is received by the receiving module and transferred to the processing module.

In an embodiment, the processing module further comprises a determining unit for showing a graph user interface (GUI) including the reference table on the display module according to the designated command.

In an embodiment, the processing module further comprises a converting unit for converting the specific value into the corresponding character.

In an embodiment, the interactive equipment is one selected from a group consisting of a television, a multimedia player, a multimedia computer and a vehicle player.

In an embodiment, the remote control device is communicated with the interactive equipment by infrared rays.

In an embodiment, the display module is a monitor.

Other objects, features and efficacies will be further understood when the following description is read with reference to the accompanying drawings.

BRIEF DESCRIPTION OF THE DRAWINGS

The above contents and the advantages of the present invention will become more readily apparent to those ordinarily skilled in the art after reviewing the following detailed descriptions and accompanying drawings, in which:

FIG. 3 is a diagram of an example of a reference table used in the system and method for producing a character according to the embodiment of the present invention.

DETAILED DESCRIPTION OF THE PREFERRED EMBODIMENT

The present invention discloses a system and method for producing a character on an interactive equipment, which will now be described more specifically by way of the following embodiments with reference to the annexed drawings. It is to be noted that the following descriptions of preferred embodiments of this invention are presented herein for purposes of illustration and description only; it is not intended to be exhaustive or to be limited to the precise form disclosed.

Figure 1:
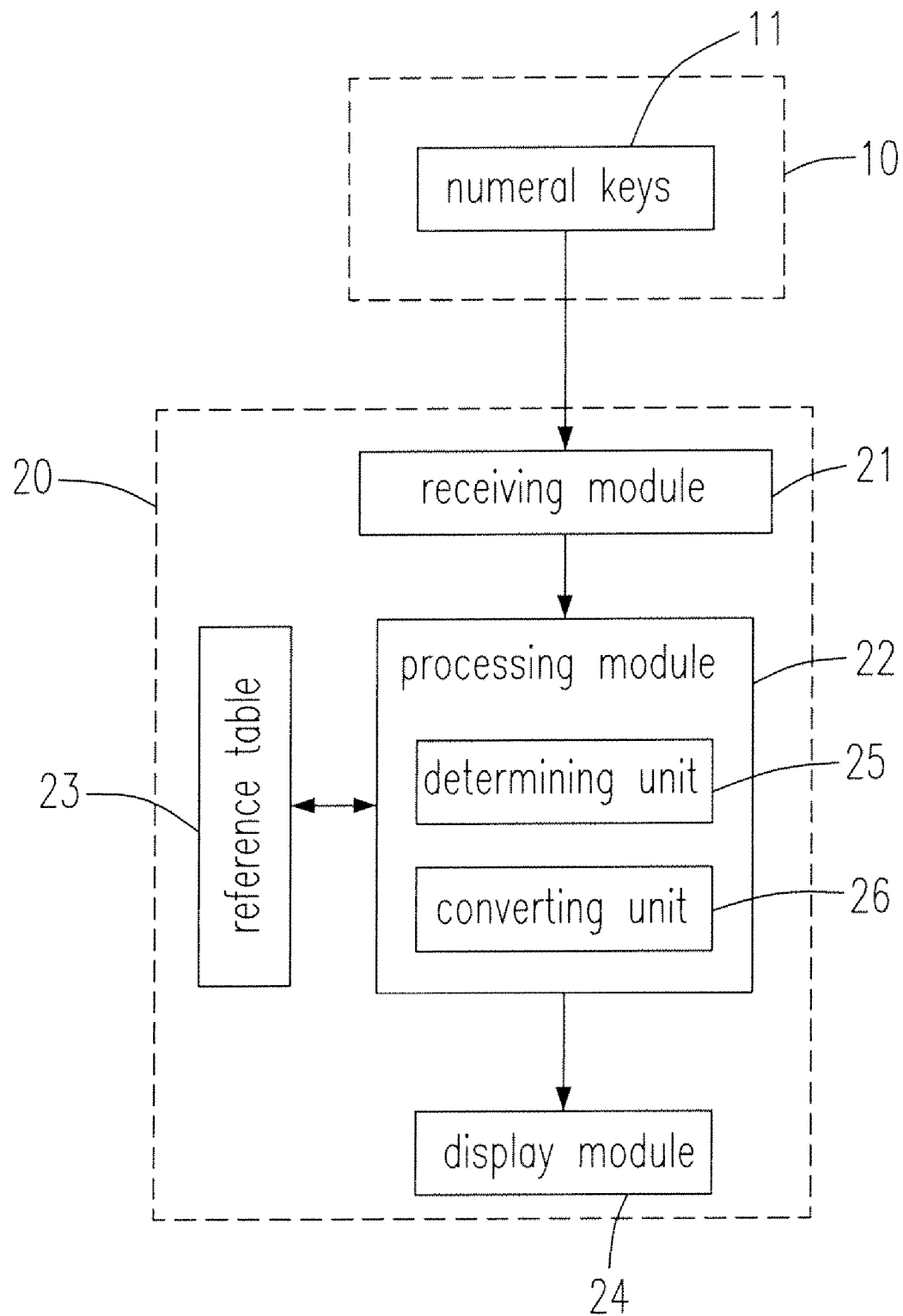
FIG. 1 is a block diagram of a system for producing a character on an interactive equipment according to one embodiment of the present invention.

Referring to FIG. 1, which is a block diagram of the system for producing a character on an interactive equipment according to an embodiment of the present invention. As shown in FIG. 1, the system is provided between a remote control device 10 and an interactive equipment 20 so that the remote control device 10 can produce the character on the interactive equipment 20 by sending a command to the interactive equipment 20 in an infrared communication manner. The remote control device 10 has a plurality of numeral keys 11 thereon. By clicking the numeral keys 11, a user can send a command to the interactive equipment 20 so that the character can be produced in the interactive equipment 20.

The interactive equipment 20 comprises a receiving module 21, a processing module 22, a reference table 23 and a display module 24. The reference table 23 has a plurality of values therein, each corresponding to a character. The receiving module is used to receive the command representing a corresponding value and interpret the command into the corresponding value. Then, the value is transmitted to the processing module 22. The processing module 22 comprises a determining unit 25 and a converting unit 26. The determining unit 25 is used to determine whether the value is a valid value with respect to the reference table 23. If so, the value is transmitted to the converting unit 26 and converted into a corresponding character according to the reference table 23. Finally, the character is displayed by the display module 24.

In a preferred embodiment, whether the reference table is to be activated and shown can be determined by the user through the remote control device 10. The user can send this activation command by a designated key so that the reference table 23 can be called out to display on the interactive equipment and thus used by the user. The designated key may be a specific value of the plurality of numeral keys 11 or other keys (not shown) in the remote control device 10. When this activation command is issued, it is received by the receiving module 21 and subsequently transmitted to the determining unit 25 of the processing module 22. Responding to the activation command, the determining unit 25 activates a graphic user interface (GUI) including the reference table 23 to be called out to display through the display module 24.

Since the reference table 23 of mapping each of the plurality of values to a corresponding one of a plurality of characters is displayed on the display module 24 of the interactive equipment, the user may directly input a specific value corresponding to a specific character through the plurality of numeral keys 11 on the remote control device 10 to the interactive equipment and the specific character can then be directly shown on the interactive equipment. In doing this, the user may achieve the purpose of producing the character without the need of keeping a key combination corresponding to the character in an associated memory and manipulating selection keys on the remote control device, effectively saving the time and cost for inputting the character.

The interactive equipment 20 may be, for example, a TV, a multi-medium player, a multi-medium computer and a vehicle use playing device. Each of the values may be a single-digit, a two-digit and a three-digit number. The display module 24 may be a monitor.

Figure 2:
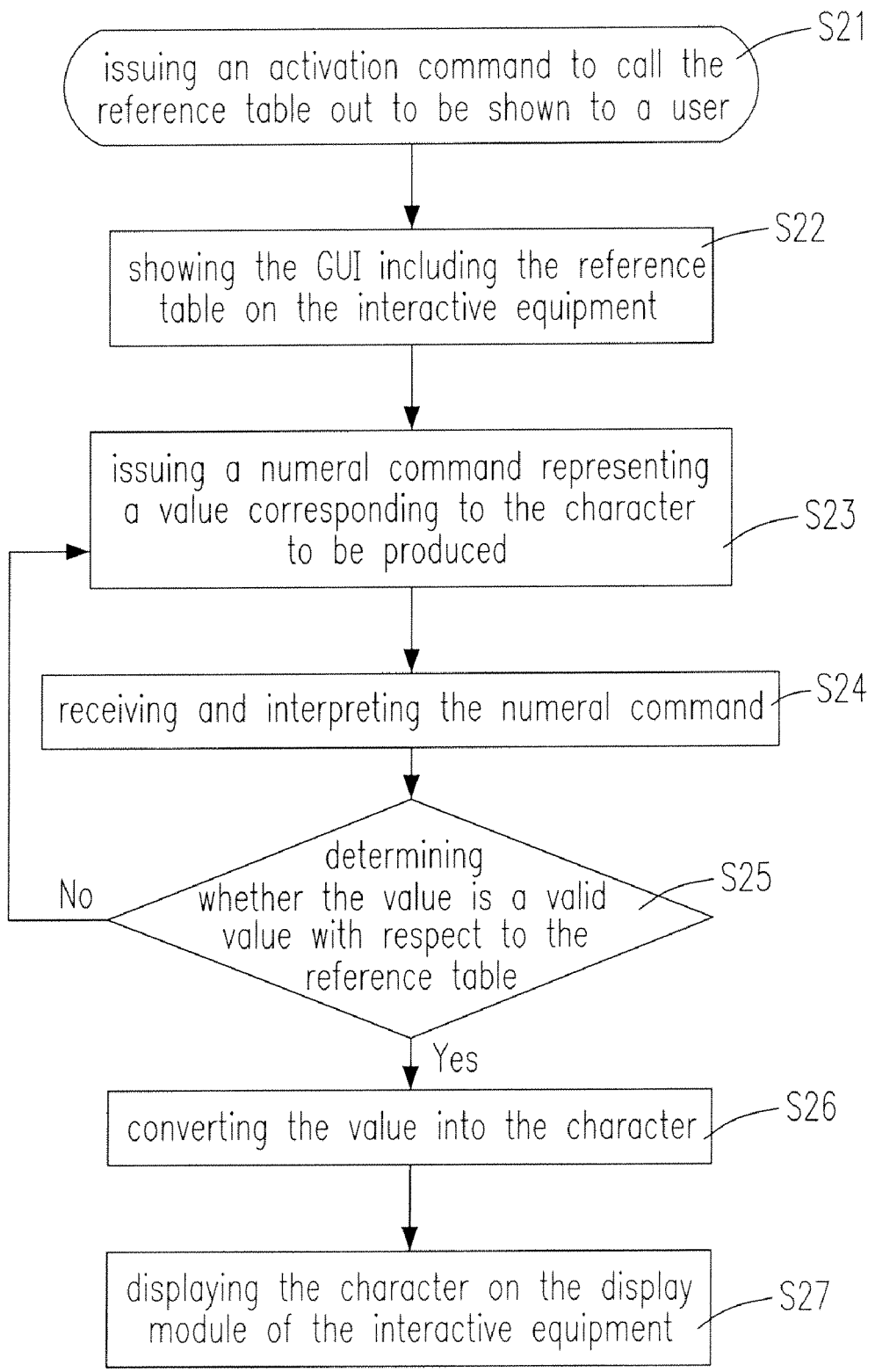
FIG. 2 is a flowchart illustrating a method for producing a character on an interactive equipment according to the embodiment of the present invention.

Referring to FIG. 2, a flowchart of a method for producing a character on an interactive equipment according to an embodiment of the present invention is shown therein. At first, an activation command is issued to call the reference table out to be shown to a user (S21) so that the GUI including the reference table is shown on the interactive equipment (S22). Next, a numeral command representing a value corresponding to the character to be produced is issued by the remote control device (S23). Then, the numeral command is received and the numeral in the command is interpreted (S24). Subsequently, the value is determined by the determining unit 25 of the processing module 22 to see if it is a valid value with respect to the reference table (S25). If not, the process goes back to the step S23. Otherwise, the value is converted by the converting unit 26 into the corresponding character by referring to the reference table (S26). Finally, the character is displayed on the display module 24 of the interactive equipment (S27).

Referring to FIG. 3, a reference table used in the system and method according to the embodiment of the present invention is shown therein. As shown, there are twenty-six values, 1 to 26, and twenty-six characters, A to Z, each having a one-to-one relationship with respect thereto. Since the reference table is shown on the interactive equipment by means of the GUI, the user can directly refer to the reference table when he/she desires to produce a character on the interactive equipment. Assuming herein the user desires to produce the character "Y", he/she may call the reference table to be activated and shown and input a value corresponding to the character by referring to the reference table. In this case, "25" should be taken as a content of the numeral command and all the user has to do is click the numeral keys "2" and "5". Although the alphabets are exemplified in the depicted reference table, the characters allowable to be used in the reference table may include other letters in ASCII or UNICODE form, such as Chinese characters and symbols. In addition, the depicted reference table is merely one of those which can be served to achieve the conversion effect between the values and the characters, and thus other reference table forms may be possible.

To obtain a more speedy and convenient inputting operation for the interactive equipment, the conventional virtual keyboard scheme may be combined with the present invention. For example, the user may execute the conventional virtual keyboard and additionally call the GUI including the reference table of the present invention to improve the conventional character inputting method. Further, the system and method of the present invention may be applied to the virtual keyboard scheme in a manner that a selection on the virtual keyboard can be replaced with the issuance of numeral command without the need of manipulating selection keys on the remote control device.

With use of the present invention, a character can be inputted to the interactive equipment having not any accompanying keyboard without the need of keeping any key combination in the associated memory and manipulating the selection keys on the remote control device. As such, the character inputting action to the interactive equipment is facilitated and more acceptable for the user.

While the invention has been described in terms of what is presently considered to be the most practical and embodiment, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for producing a specific character on an interactive equipment, comprising steps of:
   (a) providing in said interactive equipment a reference table of mapping each of a plurality of decimal values to a corresponding one of a plurality of characters including said specific character;
   (b) providing a remote control device having a plurality of numeral keys;
   (c) sending to said interactive equipment a command having one of said plurality of decimal values corresponding to said specific character from said remote control device after said one of said plurality of decimal values is inputted by clicking at least one of said plurality of numeral keys, wherein said clicked key indicates said one of said plurality of decimal values;
   (d) retrieving said specific character by referring to said reference table in response to said command; and
   (e) displaying said specific character on said interactive equipment.

2. The method according to claim 1 further comprising a step of (a0), before said step (a), enabling said reference table to be shown on said interactive equipment.

3. The method according to claim 2, wherein said reference table is shown on a graph user interface (GUI) and is activated on said interactive equipment by a designated key of said remote control device.

4. The method according to claim 3, wherein said designated key is another key in addition to said plurality of numeral keys.

5. The method according to claim 3, wherein said designated key is formed with said plurality of numeral keys.

6. The method according to claim 1, wherein each of said decimal values is a number selected from a group consisting of single-digit, two-digit and three-digit ones.

7. The method according to claim 1, wherein said specific character is coded by one of an ASCII code and a UNICODE code.

8. An interactive equipment, comprising:
   a reference table configured having a mapping relationship therein for a plurality of decimal values and a plurality of characters;
   a processing module for converting one of said plurality of decimal values into a corresponding one of said plurality of characters by referring to said reference table in response to a command having said one of said plurality of decimal values from a remote control device inputting the one of said plurality of decimal values thereinto by clicking at least one of plurality of numeral keys thereof, wherein said clicked key indicates said one of said plurality of decimal values; and
   a display module for displaying said corresponding character.

9. The interactive equipment according to claim 8, further comprising a receiving module for receiving said command.

10. The interactive equipment according to claim 9, wherein said processing module comprises a determining unit for determining whether said command is a valid command.

11. The interactive equipment according to claim 10, wherein said processing module comprises a converting unit for retrieving and converting said one of said plurality of decimal values and obtaining said corresponding character.

12. A system for producing a character, comprising:
   a remote control device, comprising:
   a plurality of numeral keys capable of inputting a plurality of decimal values for said remote control device to output a command having one of said plurality of decimal values corresponding to said character after said one of said plurality of values is inputted by clicking at least one of said plurality of numeral keys, wherein said clicked key indicates said one of said plurality of decimal values; and
   an interactive equipment, comprising:
   a receiving module for receiving said command;
   a reference table providing a relationship between said plurality of decimal values and a plurality of characters including said character;
   a processing module for converting said one of said plurality of decimal values into said plurality of characters by referring to said reference table in response to said command; and
   a display module for displaying said character.

13. The system according to claim 12, wherein said remote control device further comprises a key for outputting a designated command from said user.

14. The system according to claim 13, wherein said designated command is received by said receiving module and transferred to said processing module.

15. The system according to claim 14, wherein said processing module further comprises a determining unit for showing a graph user interface (GUI) including said reference table on said display module according to said designated command.

16. The system according to claim 15, wherein said processing module further comprises a converting unit for converting said specific decimal value into said corresponding character.

17. The system according to claim 12, wherein said interactive equipment is one selected from a group consisting of a television, a multimedia player, a multimedia computer and a vehicle player.

18. The system according to claim 12, wherein said remote control device is communicated with said interactive equipment by infrared rays.

19. The system according to claim 12, wherein said display module is a monitor.

* * * * *